July 10, 1923.
H. F. FRENCH ET AL
1,461,646
MATERIAL FOR PRODUCING SMOKE SCREENS
Filed Jan. 14, 1919
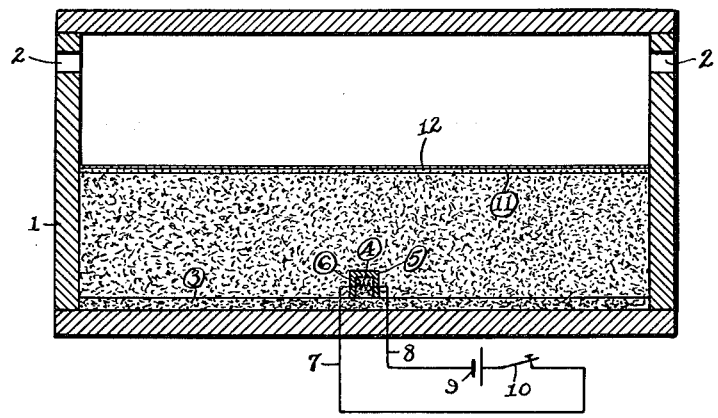
INVENTOR
H.F. FRENCH
and R.C. BENNER
BY
*H.G.Grover*
ATTORNEY Patented July 10, 1923.

1,461,646

UNITED STATES PATENT OFFICE.

HARRY F. FRENCH AND RAYMOND C. BENNER, OF FREMONT, OHIO, ASSIGNORS TO NATIONAL CARBON COMPANY, INC., A CORPORATION OF NEW YORK.

MATERIAL FOR PRODUCING SMOKE SCREENS.

Application filed January 14, 1919. Serial No. 271,126.

*To all whom it may concern:*

Be it known that we, HARRY F. FRENCH and RAYMOND C. BENNER, citizens of the United States, and residents, respectively, of Fremont, in the county of Sandusky and State of Ohio, and Fremont, in the county of Sandusky and State of Ohio, have invented a certain new and useful Improvement in Materials for Producing Smoke Screens, of which the following is a full, clear, and exact description.

This invention relates to smoke producing materials especially designed for use in smoke boxes for combating submarine warfare. The effectiveness of smoke boxes in combating submarine warfare depends upon quickly producing a large volume of opaque smoke around a vessel, or between the submarine and the vessel, in order to render it invisible to the enemy. The vessel is thus rendered a poor target for torpedoes discharged at it, and is enabled to elude the submarine.

This application is a continuation in part of our prior application Serial No. 254,739 filed Sept. 19, 1918, which particularly describes and claims the construction of a smoke box adapted to utilize the smoke producing mixture, while the subject matter and claims of this invention relate more particularly to the composition of the smoke producing mixture. It will be understood, however, that the smoke producing mixture is not limited to use in smoke boxes for submarine warfare.

The particular object of the present invention is to secure a smoke producing composition which, although of light weight and consisting of relatively inexpensive materials, will quickly produce enormous volumes of opaque smoke.

Other objects and advantageous features of the invention will appear in the accompanying description in connection with a diagrammatic drawing illustrating in a simple manner the method of using a smoke producing mixture.

The single figure of the drawing shows a diagrammatic cross section through an apparatus embodying the essential features of the smoke box of the original application.

The preferable manner of using the mixture is to enclose it in a receptacle or box 1 having openings 2 near the top. The material to be placed in the box may be divided into three portions, namely, the ignition mixture, the starting mixture and the principal smoke producing mixture.

The starting mixture consists of a layer 3 placed on the bottom of the box amounting to 3.8 lbs. of a mixture containing preferably one part of powdered charcoal to four parts of sodium nitrate by weight, although this may be varied. Each of these materials is crushed to pass through a six-mesh screen. At a certain point above this layer of starting mixture is placed the ignition mixture 4 which is arranged in the center of the box adjacent the starting mixture and enclosed in a suitable casing 5 open at the bottom. The quantity of mixture used is preferably about 2 grams consisting of powdered charcoal and powdered potassium chlorate preferably in the proportion of one part of charcoal to ten parts of potassium chlorate by weight, though this may be varied. Any suitable means is provided for igniting the ignition material. As shown diagrammatically in the drawing, this consists of a resistance wire 6 passing through the ignition material and connected by means of suitable conductors 7, 8 to an electric battery 9. The circuit is closed in any suitable manner as by means of the switch 10, in order to heat the ignition material to a temperature sufficient to start a reaction between the carbon and potassium chlorate.

The principal smoke producing mixture consists of about 75 lbs. of a mixture of hard pitch 1 part, antimony trisulphide 4 parts, sulphur 2½ parts, sodium nitrate 8 parts, and ammonium chloride 4½ parts, by weight. The proportions of the smoke producing mixture may be varied within the following limits for the purposes hereafter set forth: pitch 1 part, antimony trisulphide 1 to 8 parts, sulphur ½ to 5 parts, sodium nitrate 3 to 15 parts and ammonium chloride 1 to 10 parts. The pitch and sodium nitrate are ground to pass through a six-mesh screen and the remaining materials are powdered. As shown in the drawing, the smoke producing mixture and starting mixture only about half fill the box and are held in place by a paper or cloth cover 11 and a piece of wire netting 12.

As soon as the circuit is closed through the resistance wire, the readily inflammable ignition material in the casing is heated to the point of ignition. A highly combustible material is supplied by the charcoal and potassium chlorate, as the latter decomposes very easily and supplies oxygen for the combustion of the charcoal.

The combustion of the charcoal produces sufficient heat to propagate the reaction to the starting mixture which is adjacent to the ignition mixture. This mixture of charcoal and sodium nitrate also burns readily although in small quantities it does not produce such a vigorous reaction as the charcoal and potassium chlorate of the ignition material. The amount of the starting mixture is considerable and the reaction is sufficiently vigorous to start full smoke evolution almost instantaneously, but is not so violent as to produce an explosion which would destroy the box.

An especially important feature of the present invention is the ignition of the smoke mixture from the bottom. This method of starting has proved to be very effective in producing quickly large volumes of smoke, and also gives more uniform and certain reaction for a given period of time. The reaction starts so quickly that about 10 to 20 seconds after circuit is closed, large volumes of brownish-white smoke issue from the holes in the box, and this continues quite uniformly for 15 to 20 minutes, and by suitable changes these periods may be varied over a wide range. This period, however, covers the time during which the smoke box is useful in submarine warfare.

The theory of operation of the smoke mixture is about as follows, although we are not limited to such explanation:—The heat from the burning of the pitch vaporizes the ammonium chloride which is the main smoke ingredient, but if no other smoke material were used the vaporized ammonium chloride would react with the sodium oxide produced in some amounts by the reaction between the sodium nitrate and pitch, which would produce free ammonia, sodium chloride and water, none of which is a smoke producer. We have found that the formation of these materials is minimized by incorporating sulphur or a sulphur material in the smoke mixture, and prefer to use free sulphur and antimony trisulphide. These react with the other materials to produce good "smoke" materials. The principal ingredients in the smoke in the specific mixture used probably are ammonium chloride, sulphide, sulphite, sulphate, and antimony chloride, oxide and pentasulphide. The sulphur and antimony sulphide used also furnish heat in entering into the combination referred to, and therefore they have a double purpose.

There are various equivalents for the ingredients disclosed. One could use other powdered or granular carbonaceous material than pitch, and arsenic oxide, antimony trioxide, etc., could be substituted for ammonium chloride. Other oxygen carriers than sodium nitrate could also be employed, potassium nitrate for instance.

In case a darker colored smoke is desired, the pitch or other carbonaceous material will be used in excess, so that incomplete combustion occurs. In fact, if black smoke is sought, pitch and sodium nitrate alone admirably fulfill the requirement, provided the proportions are so manipulated as to get incomplete burning of the pitch.

By suitable changes the speed of the reaction may be varied as desired. By way of example, the speed of reaction between the smoke producing ingredients may be increased by increasing the proportion of heat forming materials and main smoke forming materials. This is most readily accomplished by diminishing the ammonium chloride content. The fuel consequently has less material to volatilize and therefore the production of smoke is more rapid, but naturally the duration of the production of smoke per pound of material will be shortened by the reduction of the main smoke producing material, and by the greater volume of smoke produced per unit of time.

Having described our invention, what we claim is:—

1. A non-explosive smoke producing mixture containing a carbonaceous material, an oxidizing agent, and a smoke forming substance vaporizable at a low temperature.

2. A smoke producing mixture containing a sublimable smoke forming material and a combustible material for volatilizing said first mentioned material.

3. A smoke producing mixture containing a sublimable chloride and a combustible material for volatilizing said first mentioned material.

4. A smoke producing mixture containing a combustible material and an ammonium salt capable of forming opaque fumes when volatilized by combustion of the material.

5. A smoke producing mixture containing ammonium chloride in combination with a combustible material and an oxidizing material adapted to react with the production of heat enough to volatilize the ammonium chloride.

6. A smoke producing mixture containing ammonium chloride, a heavy hydrocarbonaceous material and an alkali-metal nitrate.

7. A smoke producing mixture containing one to ten parts ammonium chloride in combination with one part of a heavy hydrocarbonaceous material and three to fifteen parts of an oxidizing material adapted to react with the production of heat enough to volatilize the ammonium chloride.

8. A smoke producing mixture comprising a volatile smoke-forming material, a combustible material and an oxidizing material adapted to combine to volatilize the smoke-forming material leaving a residue which would react with the smoke-forming material and a material adapted to combine with the residue to prevent said reaction.

9. A smoke producing mixture containing sulphur and ammonium chloride in combination with sodium nitrate and a combustible material adapted to react therewith with the production of heat enough to volatilize the ammonium chloride.

10. A smoke producing mixture containing a sulphide and ammonium chloride in combination with sodium nitrate and a heavy hydrocarbonaceous material.

11. A smoke producing mixture containing a sulphide, elemental sulphur, an alkali-metal nitrate, a heavy hydrocarbonaceous material and ammonium chloride.

12. A smoke producing mixture containing antimony sulphide, elemental sulphur, sodium nitrate, pitch and ammonium chloride.

13. A smoke producing mixture containing antimony trisulphide 1 to 8 parts, sulphur ½ to 5 parts, sodium nitrate 3 to 15 parts, pitch 1 part, and ammonium chloride 1 to 10 parts.

14. A smoke producing mixture containing a sulphide and a vaporizable smoke-forming material in combination with an oxidizing material and a combustible material adapted to react therewith with the production of heat enough to volatilize the smoke-forming material.

15. A smoke producing mixture containing a sulphide and a vaporizable smoke forming material in combination with a nitrate and a combustible material adapted to react therewith with the production of heat enough to volatilize the ammonium salt.

In testimony whereof, we hereunto affix our signatures.

RAYMOND C. BENNER.
HARRY F. FRENCH.